United States Patent [19]

Vanderstukken

[11] Patent Number: 5,551,195

[45] Date of Patent: Sep. 3, 1996

[54] FIRE-RETARDING WINDOW ASSEMBLY

[75] Inventor: Robert Vanderstukken, Ransart, Belgium

[73] Assignee: Glaverbel, Brussels, Belgium

[21] Appl. No.: 45,199

[22] Filed: Apr. 13, 1993

[30] Foreign Application Priority Data

Apr. 16, 1992 [GB] United Kingdom ............... 9208502

[51] Int. Cl.⁶ ............................... F06B 7/00; B32B 17/06
[52] U.S. Cl. .................... 52/171.3; 52/232; 52/786.13; 428/332; 428/428
[58] Field of Search .................... 52/171.3, 172, 52/202, 208, 235, 232, 311.1, 311.2, 789, 788, 790, 457; 264/261, 263; 428/332, 410, 428

[56] References Cited

U.S. PATENT DOCUMENTS

| 2,727,285 | 12/1955 | Stotz | 52/790 |
|---|---|---|---|
| 2,996,845 | 8/1961 | Cipriani et al. | 52/457 X |
| 3,974,316 | 8/1976 | Jacquemin et al. | 428/332 |
| 3,997,700 | 12/1976 | Jacquemin et al. | 428/332 |
| 4,104,427 | 8/1978 | Nolte et al. | 52/171.3 |
| 4,173,668 | 11/1979 | Hentzelt et al. | 428/34 |
| 4,444,825 | 4/1984 | Vanderstukken et al. | 52/232 |
| 4,485,601 | 12/1984 | De Boel | 52/232 |
| 4,799,344 | 1/1989 | Francis | 52/790 |
| 4,873,146 | 10/1989 | Toussaint et al. | 428/422 |
| 4,912,898 | 4/1990 | Holmes | 52/790 |
| 5,230,954 | 7/1993 | Sakamoto et al. | 428/332 |

FOREIGN PATENT DOCUMENTS

| 3715055 | 11/1988 | Germany . |
|---|---|---|
| 9106478 | 8/1991 | Germany . |
| 1585125 | 2/1981 | United Kingdom . |

Primary Examiner—Carl D. Friedman
Assistant Examiner—Winnie Yip
Attorney, Agent, or Firm—Spencer & Frank

[57] ABSTRACT

A fire-retarding window assembly, includes a frame; and at least two transparent window panels which are held to the frame at two opposed edges and which are disposed in edge-to-edge relationship with one another, wherein each transparent fire-retarding window panel includes a plurality of sheets of glazing material and at least one intumescent layer sandwiched between sheets of the glazing material, at least one sheet of glazing material of each panel having a fire resistance which is at least equivalent to that of a sheet of annealed soda-lime glass having the same longest dimension as the panel, having a ratio of its longest dimension to its thickness of not more than 340:1, and having a minimum thickness of 5 mm, and wherein adjacent edges of successive transparent fire-retarding window panels are sealed with a non-structural filler material which is one of non-flammable or self-extinguishing.

18 Claims, 4 Drawing Sheets

FIRE-RETARDING WINDOW ASSEMBLY

BACKGROUND OF THE INVENTION

This invention relates to a fire-retarding window assembly comprising a frame and at least two window panels.

Fire retarding window panels are conventionally mounted in a frame against an adjacent wall in such a manner that, in the event of fire breaking out, the flames are prevented from travelling through the space occupied by the panel for a desired time period, which period depends upon the construction of the panel, and may for example be 15, 30 or 60 minutes. Of course, the nature of the frame into which the window panel is fitted, and the manner in which the window panel is fitted into the frame, both have an important effect upon the fire resistance.

Architects increasingly want to be able to construct large window assemblies comprising a frame and at least two window panels. They desire these assemblies to have a minimum of visible assembly components, that is to maximise the transparent area. This can be done, for example, by arranging the window panels in side edge-to-side edge relationship and securing the panels only at the top and the bottom. However, it has not previously been thought possible for window assemblies constructed in this way to successfully act as a seal or barrier to flames and smoke. In the event of fire, such an assembly would become exposed to heat in a non-uniform way, as a result in particular of the large size of the assembly, and would be expected to become variously or irregularly deformed, so that the flames would be able to penetrate between the panels.

SUMMARY OF THE INVENTION

It is an object of the invention to provide a large fire retarding window assembly which has an increased transparent surface and which has a minimum of visible assembly components.

Thus, according to the invention, there is provided a fire-retarding window assembly comprising a frame and at least two transparent window panels which are held to the frame at two opposed edges and which are disposed in edge-to-edge relationship, wherein each transparent fire-retarding window panel comprises intumescent layers sandwiched between sheets of glazing material, at least one sheet of glazing material of each panel being at least equivalent in fire resistance to a sheet of annealed soda-lime glass having the same longest dimension as the panel and a ratio of its longest dimension to its thickness of not more than 340:1 with a minimum thickness of 5 mm, adjacent edges of successive panels being sealed with a non-flammable or self-extinguishing non-structural filler material.

The comparative fire resistance test with a sheet of ordinary soda-lime glass is carried out under the same conditions of structure and assembly as the panel being tested. Thus, in this test, the comparative sheet of ordinary soda-lime glass replaces the sheet to be tested in each of the panels.

The invention requires the panels to be secured to the frame at two opposed edges. Usually, the panels of the assembly will be arranged in side-edge to side-edge relationship, (a "horizontal arrangement") in which case the panels are secured to the frame at the top and bottom edges. It is also envisaged that the panels of the assembly will be arranged in a vertical relationship, top edge-to-bottom edge, in which case the panels are secured to the frame at their side edges. This latter ("vertical") arrangement may be useful, for example, for enclosed staircases. For the sake of simplicity, the following description assumes a horizontal arrangement of the panels, although similar remarks can also be applied to a vertical arrangement.

While the invention requires the panels to be secured to the frame, at the top and bottom edges of the glazing sheets, it is also possible that the extreme right and left side edges of the assembly be also secured to that frame. The benefit of the invention lies in the possibility of avoiding the need to secure each and every side edge of the window panels to an adjacent frame.

We prefer that each window panel has a maximum height of 3 meters, preferably less than 2.5 meters. The width of each window panel is preferably less than its height and is ideally not more than 2 meters, such as less than 1.5 meters. According to the total width of the assembly, it is preferred to use window panels of the maximum width thereby to reduce the number of joints. A total width of 20 meters is possible, but larger assemblies are also possible.

Each window panel in the assembly should be fire-retarding. By the term "fire-retarding" in this context, we mean that each window panel would provide at least 15 minutes class REI thermal protection. A glazed assembly for fire-resistance class REI shall meet both the integrity requirements of International Standard ISO 3009 - 1976. (fire resistance test—Glazed elements) and the insulation requirements of ISO 834-1975 (Fire-resistance tests— Elements of building construction). The term "REI" refers to stability/integrity/insulation as further explained in ISO 9051-1990 (Glass in building—glazed assemblies containing fire resistant transparent or translucent glass, for use in building).

The window panels may comprise glazing sheets that are constructed of borosilicate glass, of thermally or chemically tempered glass or of vitroceramic glazing material. Tempered glass may be particularly useful for stair-case enclosures and/or for providing improved building security.

We prefer that at least one sheet of glazing material of each panel is at least equivalent in fire resistance to a sheet of annealed soda-lime glass having the same longest dimension as the panel and a ratio of its longest dimension (i.e. the height) to its thickness of not more than 300:1, preferably not more than 250:1, with a minimum thickness of 6 mm. Each transparent fire-retarding window panel ideally includes at least one vitreous glazing sheet having a thickness of at least 6 mm, preferably at least 8 mm.

In some embodiments of the invention, a spacing between adjacent panels is provided, to accommodate the filler. We prefer this spacing to be from 3 to 10 mm, preferably from 3 to 6 mm, such as about 5 mm. A similar spacing is preferred between the extreme fight and left hand side panel edges and the adjacent frame. In other embodiments of the invention the panels are substantially in contact with each other, without any filler material or with only a thin layer of filler therebetween. In these embodiments, the adjacent edge faces of the panels are preferably carefully polished and is provided with chamfered comers to accommodate the non-structural filler material. These embodiments provide the assembly with a more aesthetically pleasing appearance.

The filler material, which seals adjacent edges of successive panels, is non-structural. In the present context, the term "non-structural filler" should be taken to mean that the filler is not of sufficient rigidity to provide structure to the assembly, that is to assist in maintaining the panels in a required (eg vertical) orientation.

The filler material is a non-flammable or self-extinguishing material. By the use of these materials, fire is prevented from burning through the filler material and exposing a gap between the panels through which flames and smoke may pass. In a most preferred embodiment of the invention, the filler material is intumescent. In this way, both a good seal against the passage of smoke and flames through the joint and good heat insulation at the joint can be obtained.

The term "intumescent material" is well known in the art. In the present context the term is intended to apply to a material which expands on heating, with a coefficient of expansion greater than that of the glass or other material from which the window panels are constructed.

The filler material and the intumescent material are preferably so chosen in relation to one another that the filler material is inert with respect to the intumescent material to avoid any reaction therewith, especially any reaction which would cause the filler or the intumescent material to break up when exposed to high temperatures.

Ideally, the filler material is colourless. Alternatively or additionally, the filler material may be covered with a heat reflective and/or decorative cover or protection strip of, for example, aluminium.

According to a further preferred feature of the invention, the filler material is a silicone. A particularly suitable such material is "Pensil 100", made by General Electric. This material, when exposed to fire, is automatically extinguished, expands greatly and leaves compact cinders. An alternative filler is black silicone—FIRESTOP SEALANT ex Dow Corning Corp.

The window panels preferably comprise outer sheets of flat vitreous material such as glad, laminated with one or more inner layers of intumescent materials. This construction for the window panels has the advantage that when one face of the panel is exposed to fire, the temperature on the other face of the panel remains below a specified value for a specified period of time and that under such conditions, the panel retains its integrity for as long as possible. Increased thickness of the glass sheets adds to increased stability. The laminated structure may include a central glass sheet, separated by layers of intumescent materials from two outer glass sheets. Such laminated glass sheets are known in the art, for example from British Patent No. GB 2096944-A (Glaverbel).

According to a further preferred feature of the invention, the intumescent material which may be used in the laminated window panels is selected from hydrated alkali metal silicates, such as those having a silica to alkali metal oxide ratio of from 2.5 to 5, and preferably from 3 to 4. This material provides the additional benefit that, on heating, it retains its adhesion to the glass. Especially preferred is hydrated sodium silicate, especially hydrated sodium silicate in which the weight ratio $SiO_2:Na_2O$ is 3.4:1 and containing 22 to 40% by weight water, The intumescent material may include a silicate-stabilizing agent, as described in British Patent No 2199535-A (Glaverbel).

As an alternative to the hydrated alkali metal silicates, the intumescent material may be selected from alkali metal aluminates, aluminosulphates, plumbates, starmates, borates and phosphates as described in British Patent Specification GB15851.25 (BFG GlassGroup).

It is preferable that, in use, the hydrated silicate is not exposed to the atmosphere. After time, such exposure may cause the formation of bubbles and/or the formation of a granular structure leading to loss of transparency. This is due to an exchange of water with the atmosphere and/or a reaction between the sodium silicate and the carbon dioxide of the atmosphere. In the present invention, the sealing of adjacent edges of successive panels provides a barrier between the hydrated silicate and the atmosphere.

A laminated window panel may, for example, comprise two outer glass sheets of 3 mm thickness, a central glass sheet of 8 mm thickness and two intermediate layers of hydrated sodium silicate having a thickness of 1.7 mm. Such a construction would provide 30 minutes thermal protection (REI) as defined by the International Standard ISO 9051. For 60 minutes protection, this panel may be further laminated on either face with a further 1.7 mm thick hydrated sodium silicate layer and a further 3 mm outer glass sheet.

BRIEF DESCRIPTION OF THE DRAWINGS

The invention will now be illustrated, purely by way of example, in the following examples and with reference to the accompanying drawings.

In the accompanying drawings.

DESCRIPTION OF THE PREFERRED EMBODIMENTS

Figure 1:
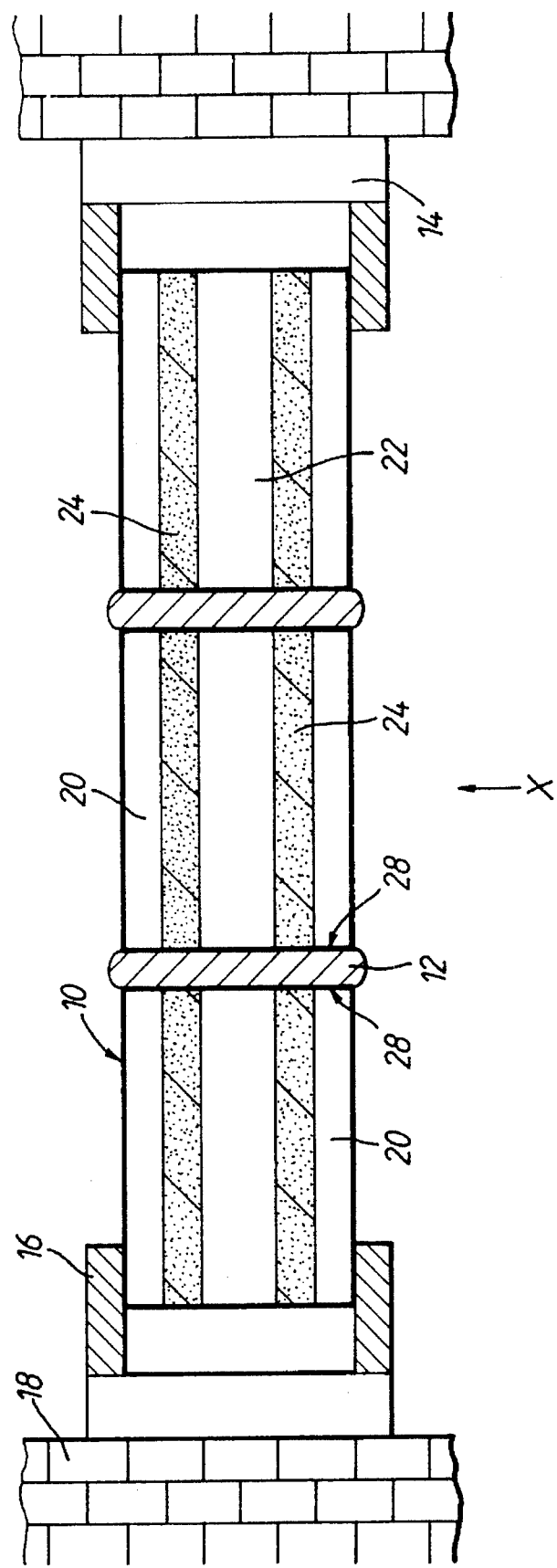
FIG. 1 shows diagrammatically a cross-sectional view from above of a fire retarding window assembly according to the invention.
Figure 2:
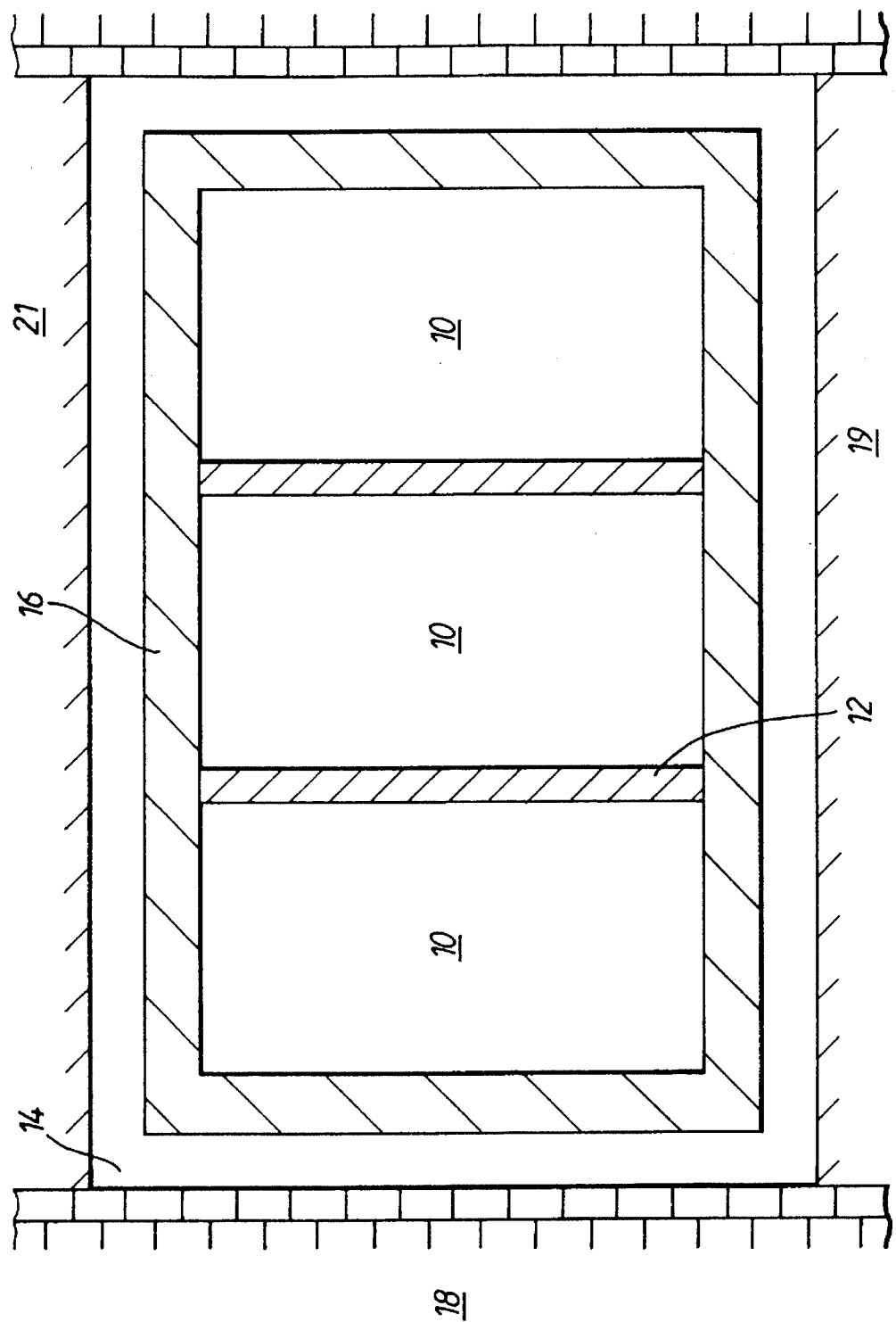
FIG. 2 shows diagrammatically a front view (in the direction of the arrow x) of the fire retarding window assembly shown in FIG. 1.
Figure 3:
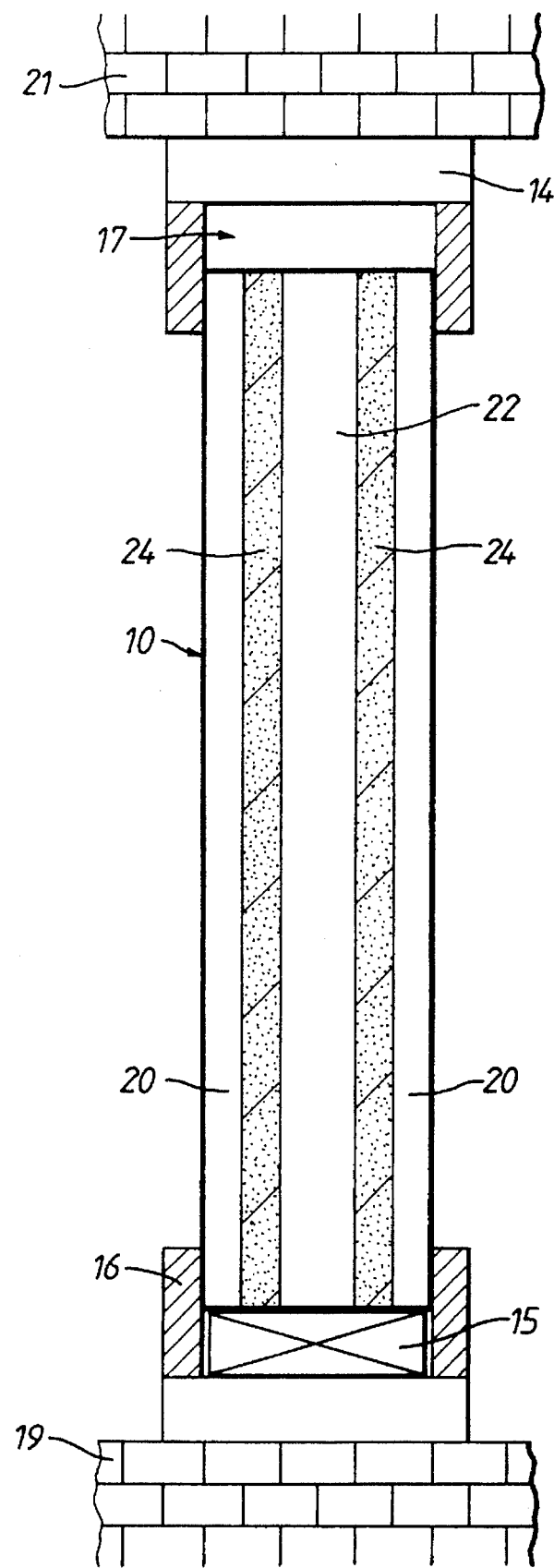
FIG. 3 shows diagrammatically a vertical cross-section of the fire retarding window assembly shown in FIGS. 1 and 2.

A symmetrical assembly was constructed, as shown in FIGS. 1, 2 and 3, comprising three transparent laminated window panels 10. Each panel had a dimension of 670 mm×1995 mm. The panels were mounted in side edge-to-side edge relationship with spacings of 5 mm between adjacent side edges 28. These spacings were sealed with a filler 12.

The panels 10 are secured at their top and bottom edges to a steel frame 14, faced with a strip 16 of "Promatect H" (ex. Promat S.A., Belgium) secured in known manner to the steel frame by bolts (not shown). "Promatect H" is a sheet material which consists of reinforced calcium silicate. The steel frame 14 is mounted against a wall 18, between the floor 19 and ceiling 21. A number of supporting blocks 15, with a height of about 4 mm, formed for example of hardwood, support the bottom edge of each panel 10 in spaced relationship to the lower run of the steel frame 14. A space 17 of about 4 mm is allowed between the top edge of the panels 10 and the upper run of the steel frame 14.

Each window panel 10 is of laminated construction, consisting of two outer glass sheets 20, a central glass sheet 22 and, sandwiched therebetween, two intermediate layers 24 of intumescent material.

In an alternative embodiment, the frame is made of hardwood or concrete, instead of steel as described hereabove.

EXAMPLE 1

In this example, the filler 12 was neutral silicone, "Pensil 100" ex GE. The two outer glass sheets 20 had a thickness of 3 mm and the central glass sheet 22 had a thickness of 8 mm. The ratio of the height of the central glass panel to its thickness was thus about 250:1. All glass sheets were formed of soda glass. The intumescent layers 24 had a thickness of 1.7 mm and were formed of hydrated sodium silicate having a water content of about 30% by weight.

The assembly was subjected to a fire test, the details of which were as set out in ISO 3009 and ISO 834, according to the test requirements specified in ISO 9051.

Briefly, this consists of building the assembly into a wall of a furnace and exposing one side of the assembly to fire according to a predetermined schedule. The time is measured after which the assembly no longer satisfies the condition that the mean temperature of the non-exposed face does not increase by more than 140 Centigrade degrees and the maximum temperature does not increase by more than 180 Centigrade degrees and in any case does not exceed 220° C. The pre-determined temperature profile consists in raising the temperature according to the formula:

$$T = 345 \log_{10}(8t+1)$$

where T is the temperature in °C. above ambient and t is the elapsed time in minutes.

As the assembly was heated, the window panels 10 expanded in their own plane causing a closing of the gaps between the panels. The silicone material 12 in the gaps remained sufficiently deformable to accommodate this closing of the gaps but remained adhered to the glass of the panels so as to maintain the seal between the panels.

It was found that the thermal insulation in the panels lasted for about 45 minutes. During the test, the joints between the panels closed and the three sheets bulged without coming apart. After 55 minutes the central sheet collapsed.

EXAMPLE 2

Example 1 was repeated except that the central 8 mm glass sheet was replaced with a 4 mm sheet of vitro-crystalline glazing material. In this case, the sheet of vitro-crystalline material was more resistant to fire and did not deform. The panel maintained its integrity and continued to provide a barrier to fumes and flames for a longer period. The sheet of vitro-crystalline material did not collapse after 55 minutes (compare Example 1). The 4 mm sheet of vitro-crystalline material itself had a fire-resistance better than a sheet of ordinary annealed soda-lime glass having a thickness of 8 mm and a height of 1995 mm (ratio 249:1).

The vitro-crystalline material had the following composition (in % by weight)

| | |
|---|---|
| $SiO_2$ | 67.1 |
| $Al_2O_3$ | 20.7 |
| $TiO_2$ | 5.9 |
| $Li_2O$ | 4.3 |
| $K_2O$ | 1.0 |
| $Sb_2O_3$ | 0.5 |
| $As_2O_3$ | 0.5 |

EXAMPLE 3

Example 1 was repeated except that the central 8 mm glass sheet was replaced with a 6 mm thermally tempered glass sheet to induce therein a mean compressive surface stress of 130 MPa. The 6 mm sheet of tempered glass itself had a fire-resistance at least equivalent to a sheet of annealed ordinary soda-lime glass having a thickness of 8 mm and a height of 1995 mm (ratio 249:1).

Figure 4:
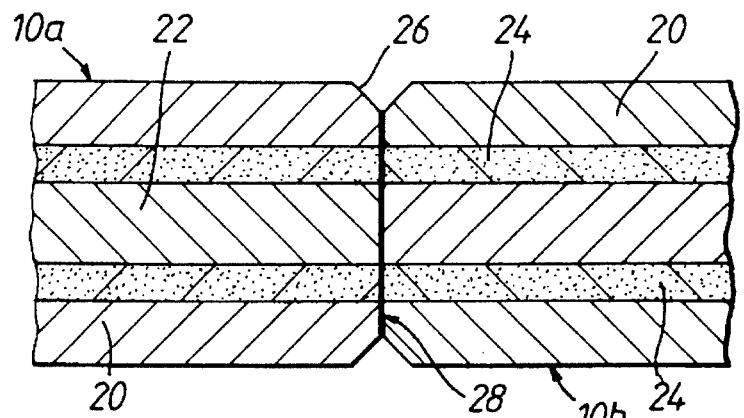
FIG. 4, 5 and 6 show diagrammatically cross-sections of alternative constructions according to the invention.
Figure 5:
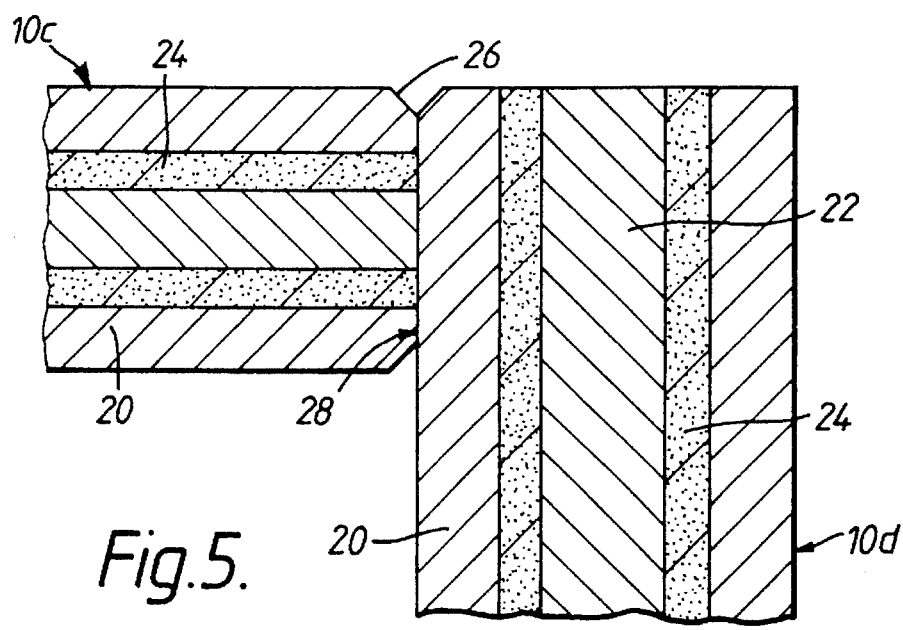
Figure 6:
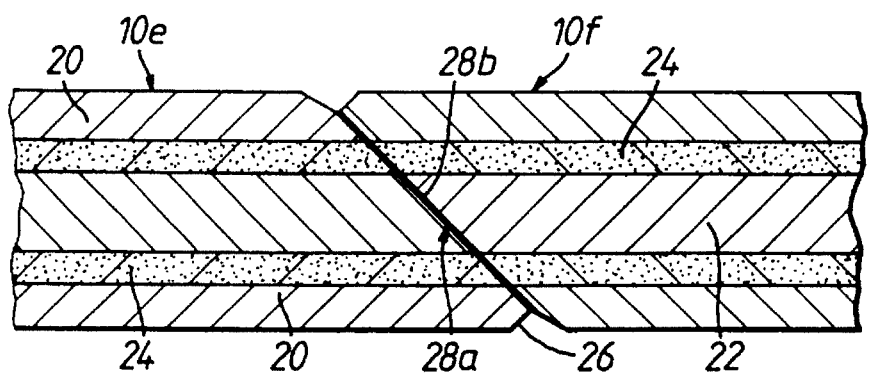

In the alternative embodiments shown in FIGS. 4, 5 and 6, the panels 10 are substantially in contact with each other, with only a thin layer of adhesive therebetween such as for example a UV polymerisable resin or silicone. In variants of the embodiments of FIGS. 4 to 6, the thin film of adhesive is omitted and adjacent panels are disposed substantially in a glass-to-glass configuration. In the embodiments shown in FIG. 4, 5 and 6, the adjacent edge faces 28 of the panels are carefully polished and are provided with chamfered corners 26 to accommodate a non-structural filler material 12 (not shown). In this manner, the sealing of adjacent edges of successive panels with the filler material is assured. These embodiments provide the assembly with a more aesthetically pleasing appearance. In FIG. 4, the two panels 10a and 10b lie in the same plane. In FIG. 5, the two panels 10c and 10d lie at right angles to each other. In FIG. 6, one large panel has been cut to form two panels 10e and 10f having bevelled adjacent edge faces 28a and 28b. The disposition of panels as shown in FIGS. 5 and 6, namely at right angles to each other or cut from a larger panel with a bevelled cutting edge, may be adopted as variants of FIGS. 1 and 2, wherein there is a space provided between adjacent panels.

What is claimed is:

1. A fire-retarding window assembly, comprising:

a frame; and at least two transparent fire-retarding window panels which are held to the frame at two opposed edges and which are disposed in edge-to-edge relationship with one another, wherein each transparent fire-retarding window panel comprises a plurality of sheets of glazing material and at least one intumescent layer sandwiched between sheets of the glazing material, wherein at least one sheet of glazing material of each panel has a fire resistance which is at least equivalent to that of a comparative sheet of annealed soda-lime glass, which comparative sheet has a longest dimension which is the same as that of the panel and a thickness such that a ratio of its longest dimension to its thickness is not more than 340:1 with a minimum thickness of 5 mm, and wherein adjacent edges of successive transparent fire-retarding window panels are assembled and sealed only with a non-structural filler material which is one of non-flammable or self-extinguishing.

2. The fire-retarding window assembly according to claim 1, wherein the at least one sheet of glazing material of each panel has a fire resistance which is at least equivalent to that of the comparative sheet of annealed soda-lime glass, which comparative sheet has a longest dimension which is the same as that of the panel and a thickness such that a ratio of its longest dimension to its thickness is not more than 300:1 with a minimum thickness of 6 mm.

3. The fire-retarding window assembly according to claim 2, wherein the at least one sheet of glazing material of each panel has a fire resistance which is at least equivalent to that of the comparative sheet of annealed soda-lime glass, which comparative sheet has a longest dimension which is the same as the panel and a thickness such that a ratio of its longest dimension to its thickness of not more than 250:1 with a minimum thickness of 6 mm.

4. The fire-retarding window assembly according to claim 1, wherein the non-structural filler material is an intumescent material.

5. The fire-retarding window assembly according to claim 1, wherein the non-structural filler material is inert with respect to the intumescent material.

6. The fire-retarding window assembly according to claim 1, wherein the non-structural filler material is non-flammable and is a silicone.

7. The fire-retarding window assembly according to claim 1, wherein each transparent fire-retarding window panel includes at least one vitreous glazing sheet having a thickness of at least 6 mm.

8. The fire-retarding window assembly according to claim 7, wherein each transparent fire-retarding window panel has an inner ply, and wherein the inner ply is formed by at least one vitreous glazing sheet having a thickness of at least 6 mm.

9. The fire-retarding window assembly according to claim 7, wherein each transparent fire-retarding window panel has an inner ply, and wherein the inner ply is formed by at least one vitreous glazing sheet having a thickness of at least 8 mm.

10. The fire-retarding window assembly according to claim 1, wherein at least one of the transparent fire-retarding window panels comprises three sheets of flat vitreous glazing material laminated with intermediate layers of intumescent material.

11. The fire-retarding window assembly according to claim 1, comprising at least three transparent fire-retarding window panels.

12. The fire-retarding window assembly according to claim 1, wherein at least one of the transparent fire-retarding window panels comprises a sheet of vitro-crystalline glazing material.

13. The fire-retarding window assembly according to claim 1, wherein spaces between successive window panels have a width ranging from 3 to 10 mm.

14. The fire-retarding window assembly according to claim 13, wherein spaces between successive window panels have a width ranging from 3 to 6 mm.

15. The fire-retarding window assembly according to claim 1, wherein the at least two transparent fire-retarding window panels are arranged in side-edge to side-edge relationship and are held to the frame at their top and bottom edges.

16. The fire-retarding window assembly according to claim 1, wherein the at least two transparent fire-retarding window panels are held to the frame only along two respective opposed edges thereof.

17. The fire-retarding window assembly according to claim 1, wherein the at least two transparent fire-retarding window panels are held to the frame only along opposed edges thereof which are not disposed in edge-to-edge relationship to one another.

18. The fire-retarding window assembly according to claim 1, wherein adjacent edges of successive transparent fire-retarding window panels are assembled and sealed only with a non-structural filler material without any additional frame support.

* * * * *